United States Patent [19]

Thornburg

[11] 4,180,222
[45] Dec. 25, 1979

[54] AILERON SEGMENT CONTROL FOR A FLAPERON SYSTEM

[75] Inventor: Francis L. Thornburg, Canoga Park, CA

[73] Assignee: Lockheed Aircraft Corporation, Burbank, Calif.

[21] Appl. No.: 754,823

[22] Filed: Dec. 27, 1976

[51] Int. Cl.² .......................... B64C 9/06; B64C 9/12
[52] U.S. Cl. .................................... 244/75 R; 74/25; 244/215; 244/90 R
[58] Field of Search ............ 244/42 R, 42 D, 42 DA, 244/42 DB, 43, 44, 46, 90 R, 83 C, 83 B, 83, 90 R, 75 R, 213, 215, 216, 201; 74/25, 840-842, 348, 350, 351, 801

[56] References Cited

U.S. PATENT DOCUMENTS

| | | | |
|---|---|---|---|
| 2,222,935 | 11/1940 | Chilton | 244/43 |
| 2,236,838 | 4/1941 | Robert | 244/90 R |
| 2,578,026 | 12/1951 | Taylor | 74/25 |
| 2,623,717 | 12/1952 | Price | 244/83 G |
| 2,658,701 | 11/1953 | Robertson | 244/42 DA |
| 3,568,957 | 3/1971 | Wood | 244/42 DB |
| 3,608,390 | 9/1971 | Barrett | 74/348 |
| 3,640,150 | 2/1972 | Leiner | 74/801 |

FOREIGN PATENT DOCUMENTS

515690 12/1939 United Kingdom ............... 244/42 DB

Primary Examiner—Galen L. Barefoot
Attorney, Agent, or Firm—Lowell G. Turner

[57] ABSTRACT

An improved control system for the aileron segment of a combined flap and aileron (flaperon) wherein the flaperon, supported, extended and retracted by conventional means, is described. It consists of a splined shaft rotatably mounted on an aircraft wing, its longitudinal axis being substantially aligned with the extension and retraction path of the flap. A transfer gear box slidably engages the splined shaft and is supported by a roller assembly engaging a support track which is mounted in the wing and runs substantially parallel to the splined shaft. The transfer gear box incorporates gears to transfer rotation of the splined shaft, via a second angularly adjustable shaft, to an aileron segment rotation mechanism located on the flaperon at the axis of rotation of the aileron segment. Rotation of the aileron segment is accomplished by rotating the splined shaft, regardless of the location or movement of the flap; this by virtue of the fact that the transfer gear box slides along the splined shaft, maintaining at all times a fixed distance between itself and the aileron segment rotation mechanism. A torque multiplier increases that torque when transmitted through small light-weight components, to the magnitude required for aileron actuation.

20 Claims, 12 Drawing Figures

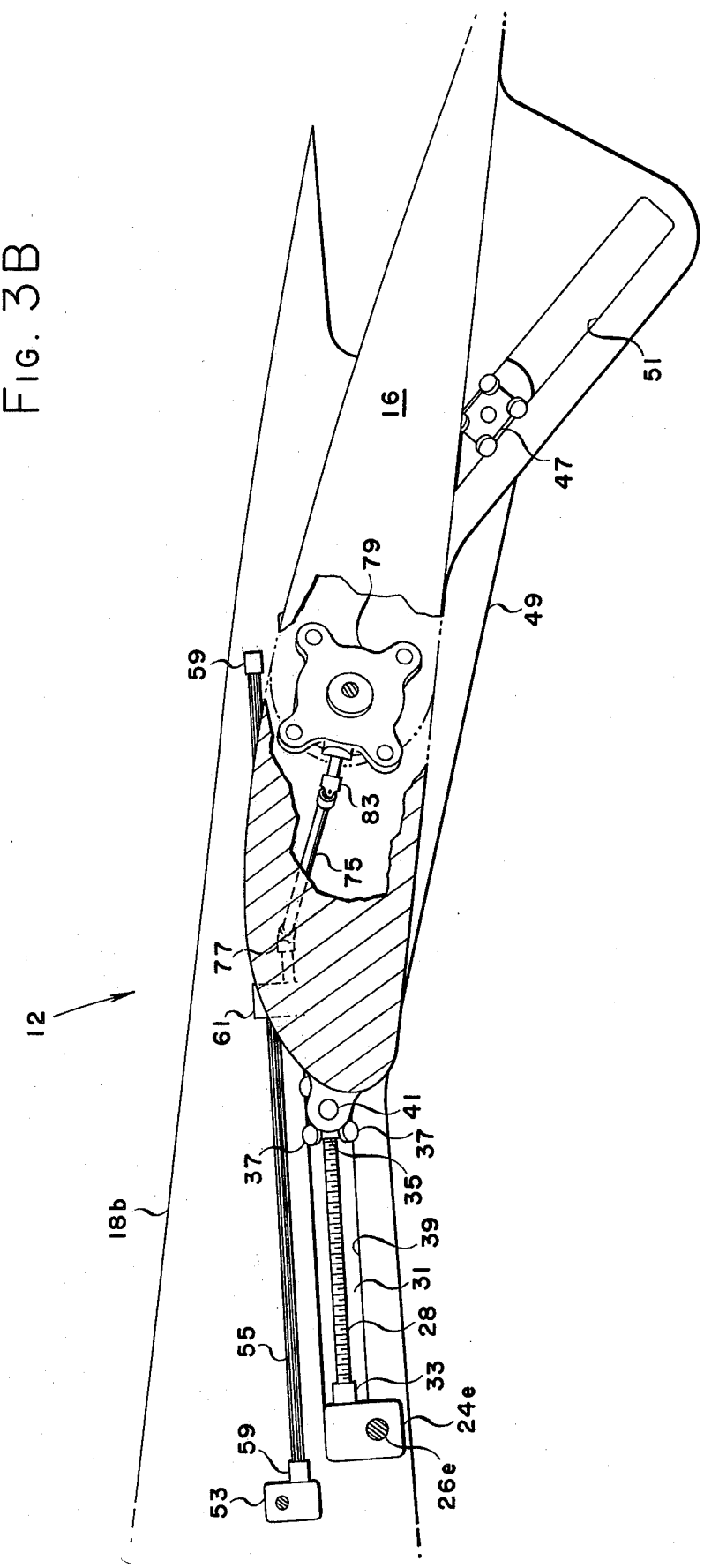

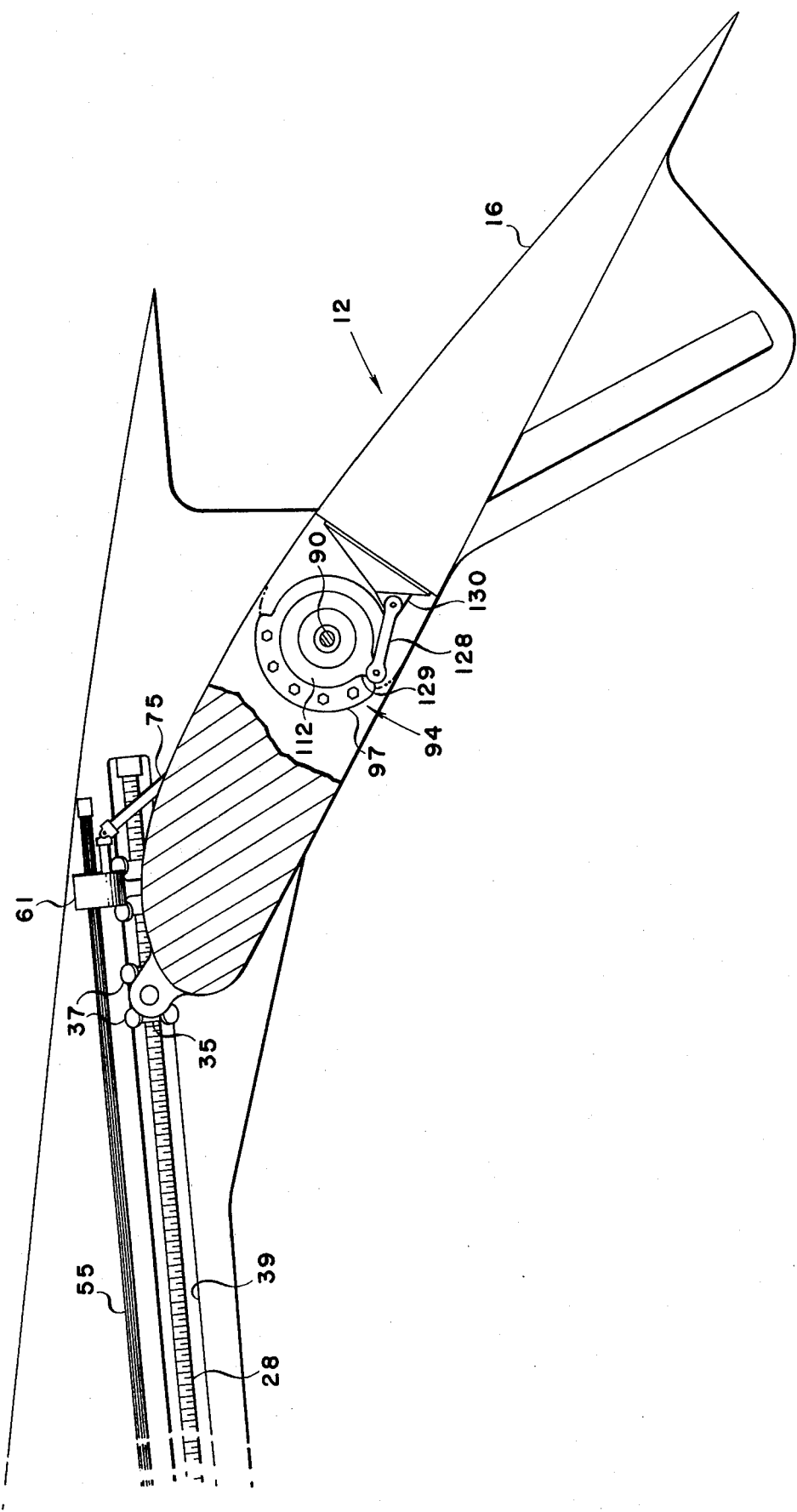

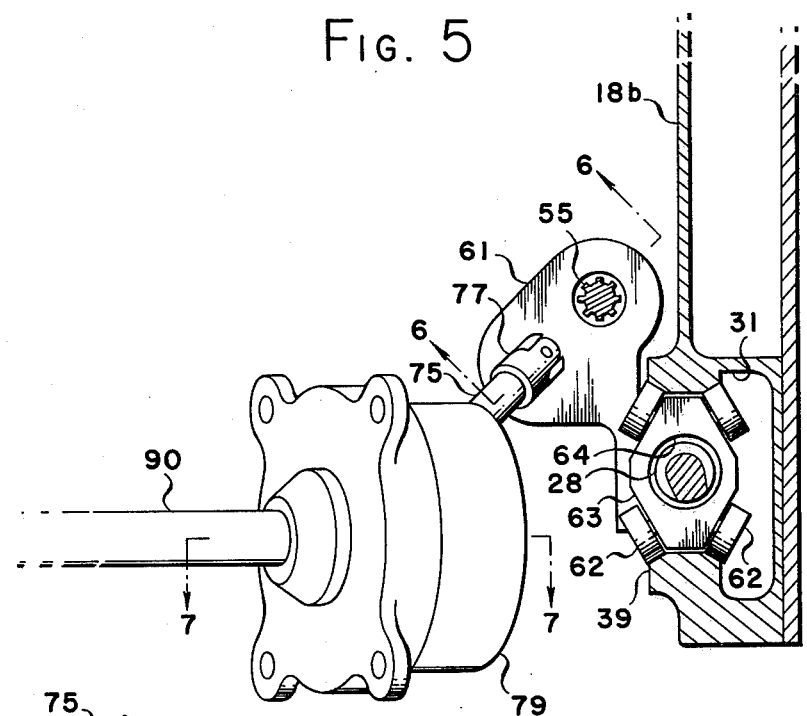
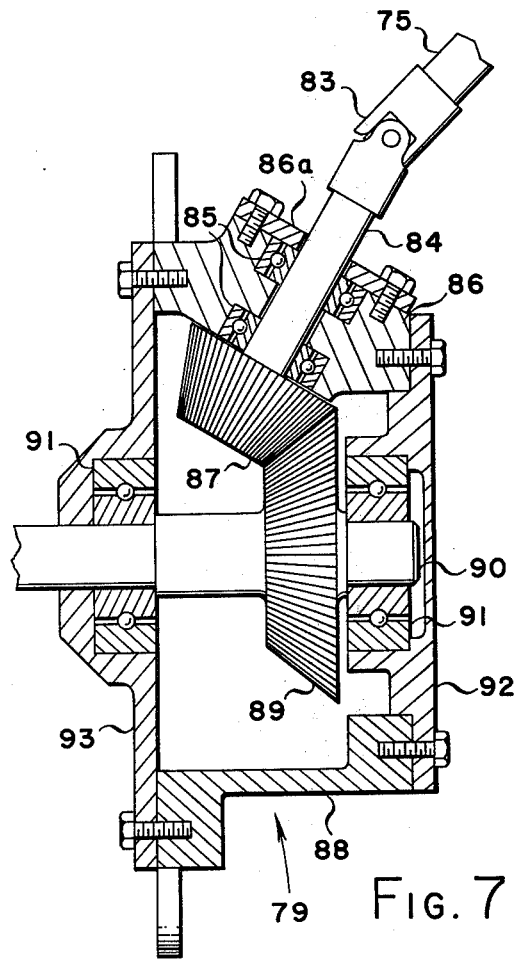
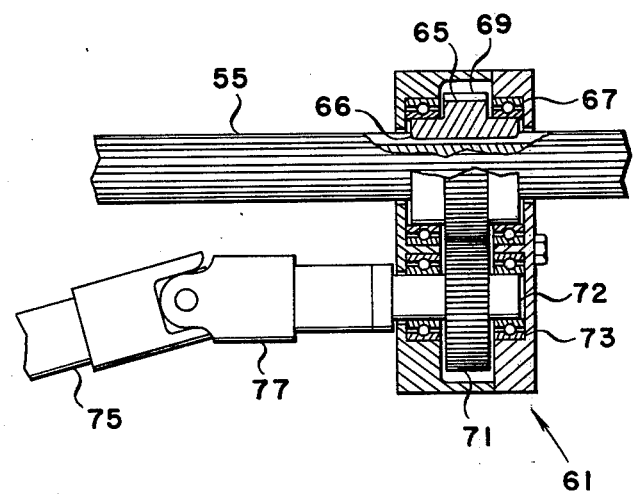

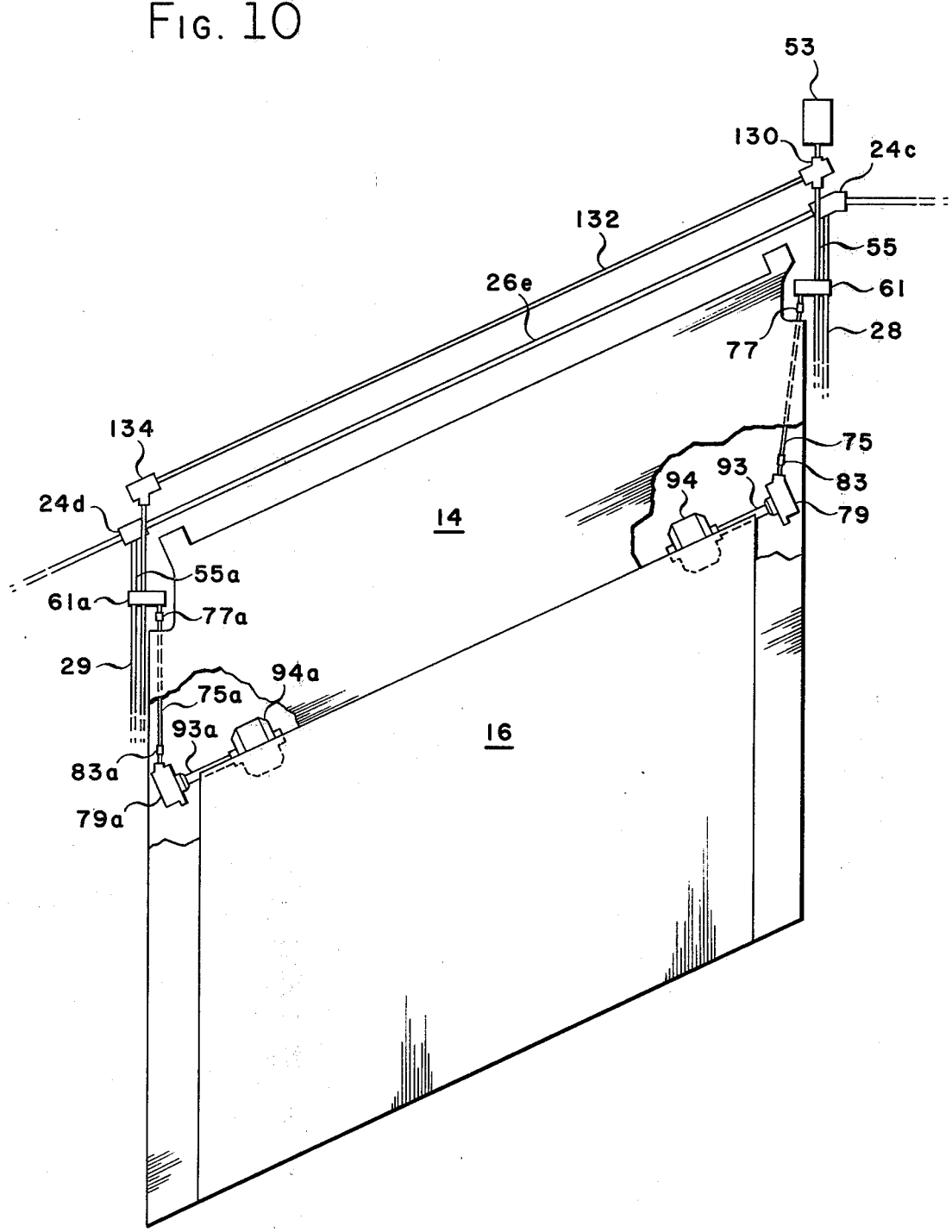

AILERON SEGMENT CONTROL FOR A FLAPERON SYSTEM

BACKGROUND OF THE INVENTION

Description of the Prior Art

Aircraft which incorporate flaperons, particularly the instant invention, have numerous advantages over conventional aircraft having separate flaps and ailerons. These advantages become readily apparent upon examining the functions of these control surfaces. The lift of a wing, in part, is proportional to its coefficient of lift, its area and the square of its velocity as it moves through the air. Thus, at cruising speed, the wing area and the coefficient of lift required to maintain the aircraft's altitude is considerably less than that required at take-off or for slow-approach landing speeds. Sizing the wing for these latter conditions, which only exist for a few moments during a flight, would result in gross inefficiencies during the rest of the flight regime. In such case, the aircraft would have to carry the excess weight of the larger wing throughout the flight and would be subjected to a large drag penalty because of the greater wing surface area. The end results would be a reduced payload and higher fuel consumption. Thus, a major consideration in selecting the size of the wing is the aircraft's primary mission; i.e., conditions that the aircraft will face for the majority of its flight. This dictates the use of a wing area considerably smaller than that which take-off distance and landing speed would seem to demand.

This problem has been solved in the past by incorporating devices such as flaps into the wing, which can be extended rearward and downward as required, thereby effectively increasing wing area, and also increasing the coefficient of lift by increasing the mean camber line of the wing. This flap system is installed at the trailing edge of the wing.

Additional requirements for lateral or roll control also require that ailerons be incorporated into the trailing edge, reducing the space available for flaps. This loss of flap space on the trailing edge has been a particularly vexing problem on high-speed aircraft. Further difficulties have been engendered by the requirement for cruising speeds of 0.8 times the speed of sound, and higher. This has made necessary the use of swept wings, causing the ailerons which are mounted on the wing tips for maximizing the moment arm, to become ineffective at these high cruise speeds.

In certain cases, the phenomenon of aileron reversal occurs; i.e., when the pilot attempts to roll to the right, an aileron reversal causes a roll to the left. This results primarily from the facts that any practical wing is flexible and the dynamic loads at high speed are very large. When the aileron is deflected downward, for example, thereby attempting to increase the coefficient of lift by increasing the mean camber line, a resulting increase in dynamic pressure on the aileron causes the wing to twist. This twisting causes an overall decrease in the angle of attack of the wing tip, reducing the net force to zero, or until such time as there is a net downward force on the wing tip instead of a net upward force, thereby inducing the aileron reversal effect.

Such aileron reversal has required that a second set of ailerons be incorporated, further inboard from the wing tip, to provide roll control at higher speeds. Of course, the outer ailerons are still required for low speed flight. The net result is to further reduce the space normally allocated for flaps.

Thus, the design of a system efficiently combining the functions of an aileron with those of a flap is a highly desirable goal. Flaperon systems designed for such a purpose are far from new, as illustrated in U.S. Pat. Nos. 2,236,838 and 2,276,688, the closest prior art of which I am aware; however, none of the prior art systems are truly compatible with or adaptable to modern aircraft. Such prior art systems are complicated, generally unreliable, and heavy, or they occupy too much space in the wing, drastically reducing the fuel storage capacity. The inability to obtain high aileron response times has also been a problem in prior art systems. Therefore, a flaperon system compatible with state-of-the-art flap actuator systems would significantly improve the art by providing a considerable increase in the lift available for take-off and landing without increasing the overall size of the wing, as well as accommodating a considerable increase in aircraft take-off weight.

SUMMARY OF THE INVENTION

The flaperon system of this invention consists of a flap having as a portion thereof an independently adjustable aileron segment attached to the primary flap structure by a series of hinges. The flaperon is positioned at the trailing edge of the wing between two rearwardly extending beams attached to the main wing structure. A conventional actuation system is incorporated in the wing to extend and retract the flaperon.

The aileron segment actuation control system consists of a rotatable spline shaft mounted in one of the beams, its forward end being connected to a motor. Its longitudinal axis extends in a rearward direction substantially aligned with the extension and retraction path of the flaperon. A transfer gear box is mounted in a support track within the beam and oriented substantially parallel to the splined shaft. The transfer gear box also incorporates an input gear having internal splines mated with and slidably engaging the shaft splines. External teeth upon the input gear also engage an offset output gear within the transfer gear box. One end of an intermediate shaft is connected within the transfer gear box to the output gear via a universal joint. The other end of that shaft is connected through a second universal joint to a direction-changing gear box; the gear box being mounted upon the side of the flap segment at the aileron segment hinge axis and movable therewith.

The direction-changing gear box connects and transmits the rotation of the intermediate shaft to an aileron actuating shaft; the shaft being rotatably mounted to the flap in alignment with the hinge axis of the aileron segment. This actuating shaft connects to and drives an input member of a torque multiplying planetary gear assembly which is also mounted to the flap on the aileron segment hinge axis. The output member of the planetary gear assembly in turn is connected to the aileron segment via a link. Thus, the flaperon can be extended or retracted with or without aileron movement, since the transfer gear box slides on the splined shaft. Aileron segment movement is obtained by actuating the motor, causing the splined shaft to rotate. This rotation is transmitted through the above-described mechanisms to the aileron segment.

Therefore, it is an important object of this invention to provide an improved aileron segment control system for a flaperon compatible with modern aircraft wing construction.

Another object is to provide an aileron segment control system that accommodates a high aileron response time.

Another important object of this invention is to provide a simplified, compact, light-weight and reliable aileron segment control system.

These and other objects will become readily apparent from a detailed reading of the specification.

BRIEF DESCRIPTION OF THE DRAWING

FIG. 3B is a side view of the flaperon partially cut away and in a partially extended position to further illustrate the actuating mechanism of FIG. 3A;

FIG. 3C is a side view of the flaperon of FIGS. 3A and 3B fully extended and partially cut away, and additionally showing the connection of the planetary gear assembly to the aileron;

FIG. 5 is an elevational view taken along line 5—5 of FIG. 2, showing the direction-changing gear box and the transfer gear box mounted in the wing beam;

FIG. 6 is a cross-sectional view of the transfer gear box, taken along line 6—6 of FIG. 5 and rotated;

FIG. 7 is a cross-sectional view of the direction-changing gear box, taken along line 7—7 of FIG. 5 and rotated into plane;

FIG. 10 is a top view of a dual aileron segment control system in semi-schematic form partially cut away to show details of the actuating mechanism.

DESCRIPTION OF THE PREFERRED EMBODIMENTS

Figure 1:
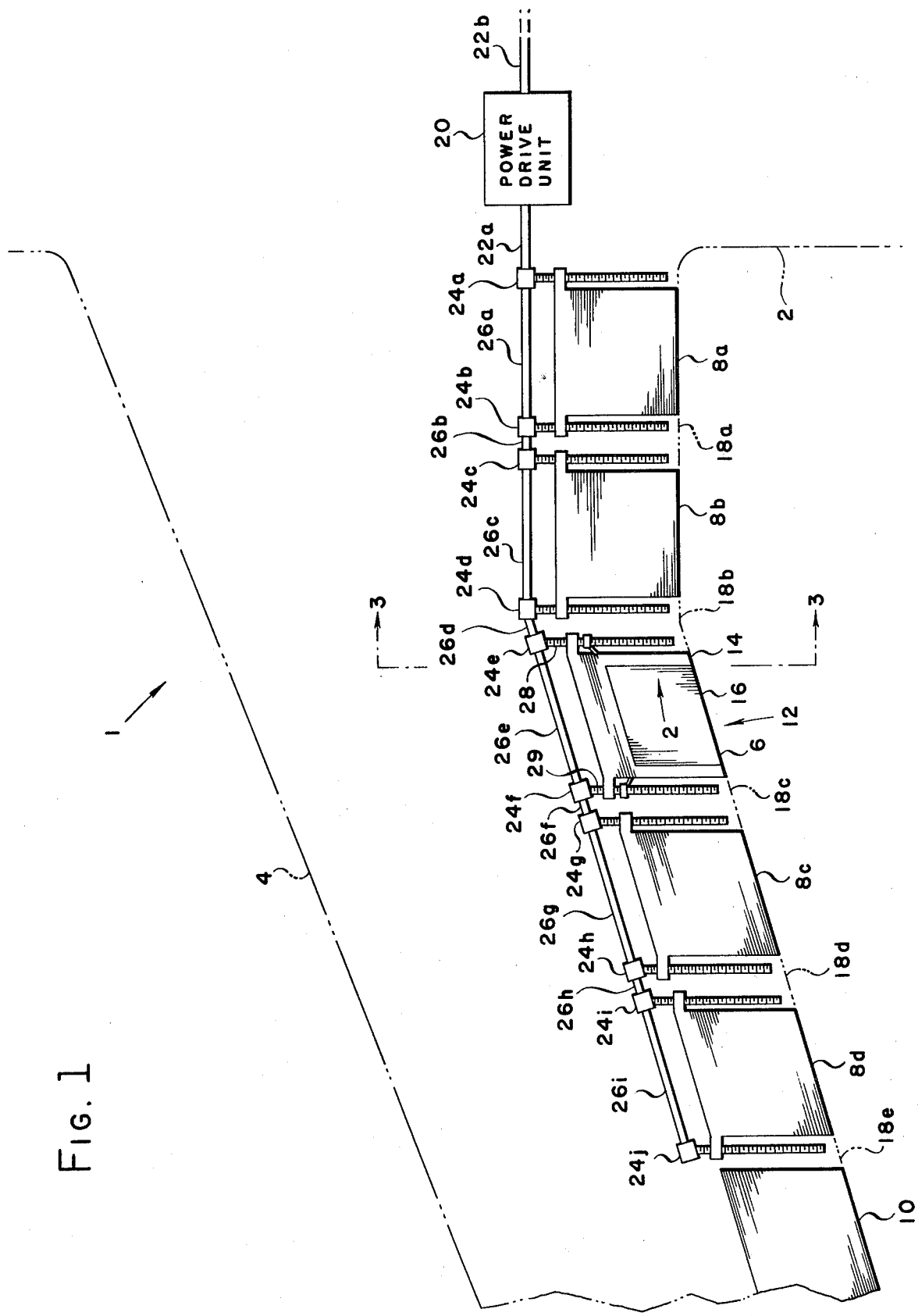
FIG. 1 is a fragmentary top view of the wing, generally illustrating the mechanisms of this invention in semi-schematic form.

Referring now to the drawings in detail, FIG. 1 shows a conventional aircraft 1, only fragmentary portions of the fuselage 2 and one wing 4 being illustrated in phantom. Along the trailing edge 6 of the wing 4 are a series of retractable falps 8a–8d, commonly called Fowler type flaps. A conventional aileron 10 is positioned at the outermost portion of the wing to provide lateral control. Between the flaps 8b and 8c is a flaperon 12 consisting of an extendable flap segment 14 which incorporates an aileron segment 16 conventionally hinged within the flap segment for independently controllable movement. In the instant case, while the flap and aileron segments 14 and 16 together function in a manner similar to the conventional flaps 8a–8d, the aileron segment 16 also functions independently of the flaps, but in conjunction with the outboard aileron 10. The flaps and flaperon are separated by a series of flap support beams 18a–8e extending from the main wing support structure (not shown) to the trailing edge 6. Mounted in the fuselage 2 is a power drive unit 20 for the flaps, usually in the form of a hydraulic motor, although an electric motor is sometimes used. The power thereby provided is supplied by engine-driven pumps, and controls for the motor are located in the flight station. These components and the interconnecting systems are conventional in nature and have not been shown since they are not essential for a proper disclosure of the instant invention.

The power drive unit 20 is operatively connected to shafts 22a and 22b which extend outward toward both the wing 4 and the opposite wing (not shown). The drive shaft 22a connects to a series of conventional gear box assemblies 24a–24j through a series of connecting shafts 26a–26i appropriately mounted to the main wing structure ahead of and to the side of each of the flaps and the flaperon.

It should be understood that the wing flaps, flaperons and ailerons are symmetrical about the fuselage. Therefore, the specification describes only one side. Furthermore, since the flap and the flaperon extension and retraction systems are essentially identical, only a detailed description of the flaperon is presented. Still referring to FIG. 1, the gear box 24e receives the shaft 26d and, in turn, drives the shaft 26e which is directed outward along the wing, connecting into the gear box 24f as well as a threaded shaft 28 which extends rearward along the inboard side of the flaperon. The gear box 24f drives the threaded shaft 29 which extends rearward on the outboard side of the flaperon.

The gear boxes 24e and 24f are conventional in design. They do nothing more than divide a single input into two outputs and are well known to those with ordinary skill in the art. They are not an essential element of the invention and are not discussed in detail.

Figure 2:
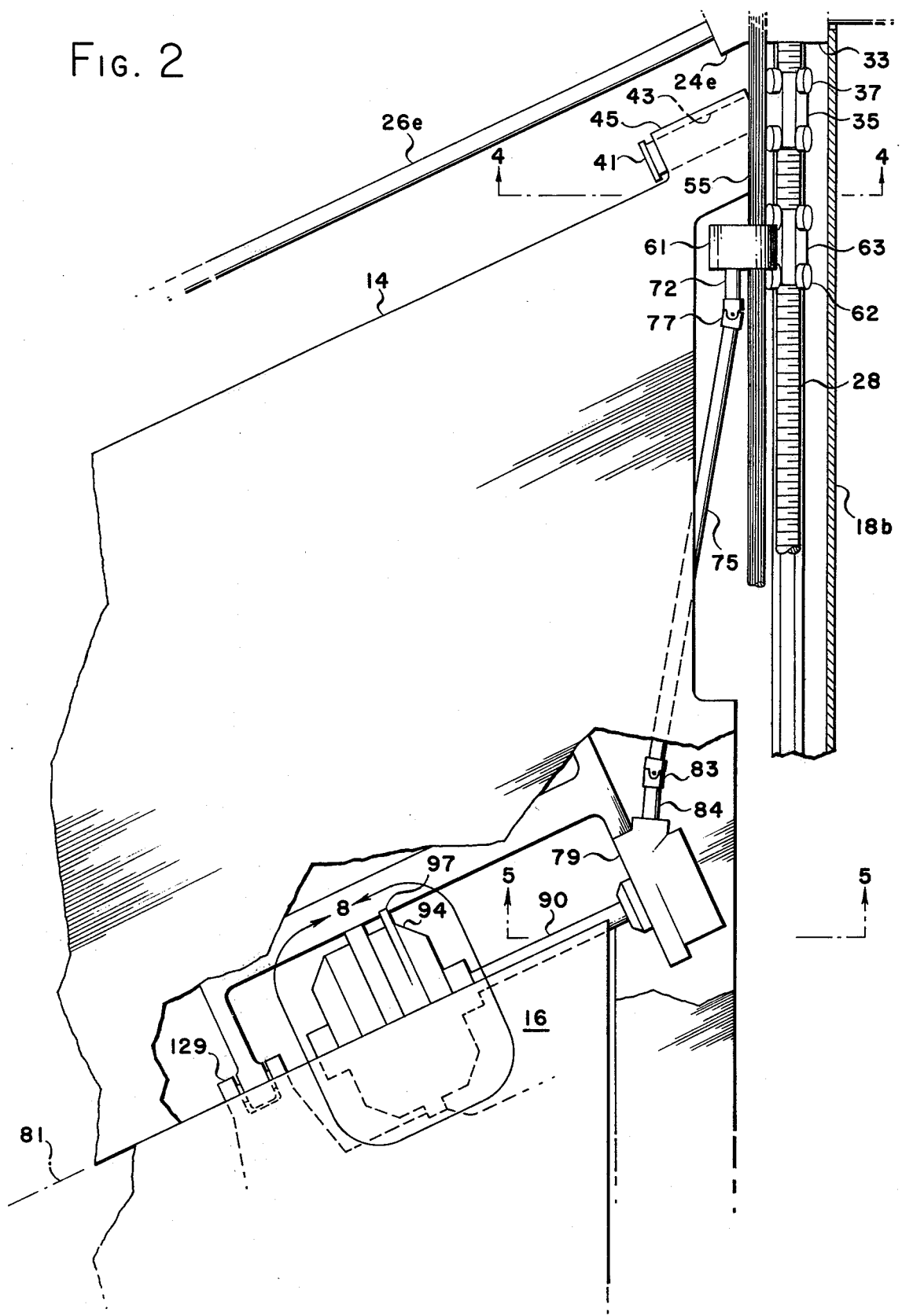
FIG. 2 is a top view of a portion of the flaperon in the region indicated by the arrow 2 in FIG. 1 and enlarges to better illustrate detail of the aileron segment control system.
Figure 3A:
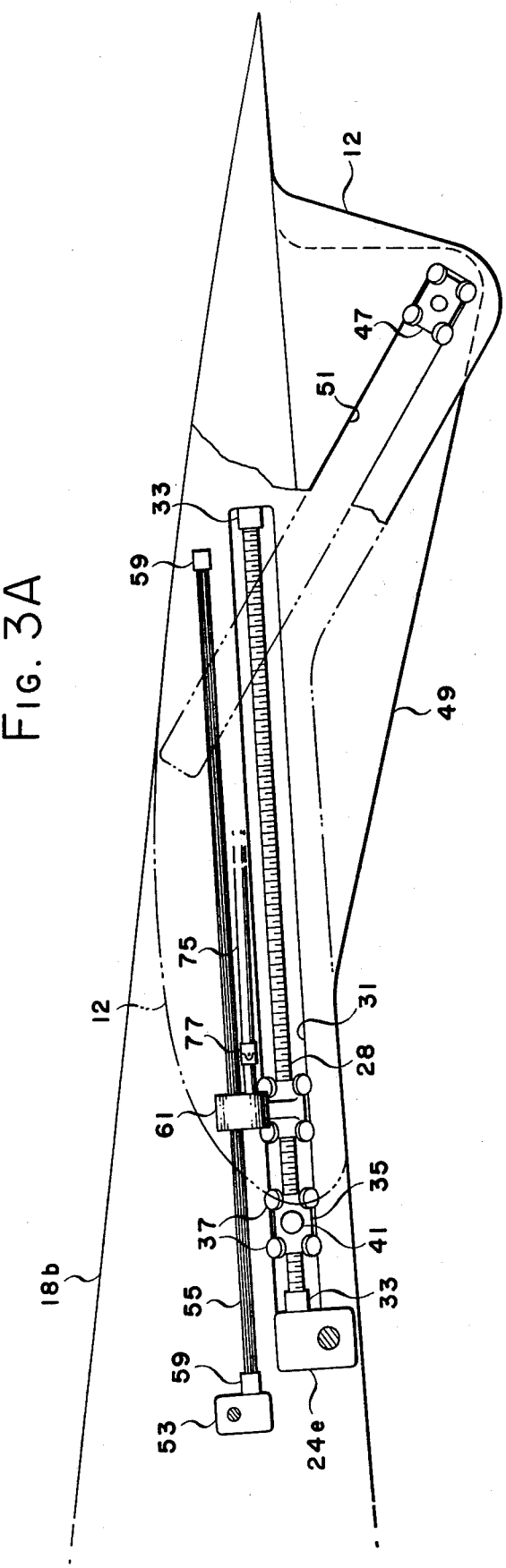
FIG. 3A is a side view of the flaperon actuating mechanism taken substantially along line 3—3 of FIG. 2.

As shown in FIGS. 2 and 3a, the threaded shaft 28 is mounted in a groove 31 in the beam 18b inboard of the flaperon. The shaft is rotatably supported at its forward and aft ends by bearing mounts 33 appropriately attached to the beam 18b. The shaft 29 (shown in FIGS. 1 and 10) is mounted in beam 18c outboard of the flaperon in a similar fashion. Upon actuation of the power unit 20, the threaded shafts 28 and 29 are caused to rotate because of the interconnection of shafts 22a and 26a–26e via gear boxes 24a–24f.

Figure 4:
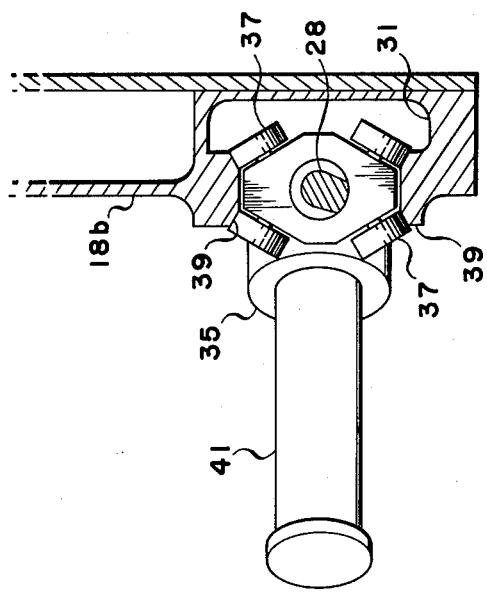
FIG. 4 is a cross-sectional view taken along line 4—4 of FIG. 2 and showing the ball screw assembly mounted in the wing beam.

Referring to FIGS. 2 through 4, a conventional recirculating ball screw assembly 35 engages the threaded shaft 28. It is also supported by attached rollers 37 which ride on tracks 39 partially within the groove 31. Forward support for the flaperon is provided by a pin 41 attached to the ball screw assembly 35. The pin engages a mating bore 43 in a lug 45, extending forward at the front of the flaperon.

Referring in particular now to FIG. 3a and 3b, it can be seen that a roller assembly 47 is mounted at the rear of a downward extension 49 of the beam 18b. It engages a track 51 which extends downward from the side of the flaperon and is adapted to swivel in its mount (not shown) to further support the flaperon in its forward and rearward movement. An identical mounting system is incorporated in the beam 18c (FIG. 1) on the outboard side of the flaperon and, therefore, is not described in detail. The flaperon is thereby provided with a four-point support, as are all the flaps. Still referring to FIG. 3a, it can be seen that rotation of the threaded shaft 28 drives the ball screw assembly 35, causing it to translate toward the trailing edge 6 of the wing, additionally causing the attached flaperon 12 to extend backward and downward in a path indicated by the shape of the track 51.

Mounted on the wing forward of and above the gear box 24e, is a motor 53, preferably hydraulic. Control of the motor; i.e., whether it turns clockwise or counterclockwise, is accomplished in an entirely conventional manner by movement of the pilot's control wheel in the flight station via a control system. Since this motor control system need only be state-of-the-art and is not significantly a part of the invention, it is not disclosed in further detail. Furthermore, an electric motor with an electrical control system may be substituted and remain compatible with the instant invention. The motor 53 is connected to a splined shaft 55 extending rearward along the beam 18b above and substantially parallel to the threaded shaft 28. It is rotatably supported by forward and rear bearing mounts 59 attached to the beam 18b. This motor 53, the splined shaft 55 and their supports are sometimes referred to as the aileron segment rotation means or rotation power means.

FIGS. 2, 5 and 6 show a transfer gear box 61 disposed upon and slidably engaging the splined shaft 55. It is supported by a plurality of rollers 62 mounted upon a track or bearing bracket 63 attached to the gear box 61. The rollers 62 engage the tracks 39 on the beam 18b in the same manner as do the rollers 37 of the ball screw assembly 35. The threaded shaft 28 passes through a hole 64 in the bearing bracket 63 without structural engagement between the two. The transfer gear box 61 contains a first gear 65 formed upon a hollow gear element 66 which is supported by a pair of bearings 67. The gear element 66 is internally splined to mate with and slide over the external splines of the shaft 55. The teeth of the gear 65 mesh with a second gear 71 fixed to and adapted to drive an output shaft 72 supported by a pair of bearings 73 and extending parallel to the shaft 55. This output shaft 72 connects to a second or intermediate shaft 75 through a universal joint 77. Thus, the transfer gear box assembly 61 may slide freely down the splined shaft 55. Simultaneously, intermediate shaft 75 can be caused to rotate by rotation of the splined shaft 55. Note that while splines are specified for minimum play and maximum load transfer between the shaft 55 and gear 65, other engaging means can be used, for example, a shaft with a square cross section.

The intermediate shaft 75 is connected at its opposite end via a second universal joint 83 to a direction-changing box 79 fixed to the flap segment 14, its axis being common with the aileron hinge axis 81.

The transfer gear box 61, its bearing bracket 63, the shafts 72 and 75 and the universal joints 77 and 83, together with their supporting bearings, etc., are collectively referred to as a first power transfer means or first shaft rotation transfer means.

In FIG. 7, which is a cross-sectional view of the direction-changing gear box assembly 79, it can be seen that the universal joint 83 is connected to an input shaft 84 rotatably supported by and extending through a pair of bearings 85 mounted in a housing 86. A cover plate 86a bolted to the housing 86 acts to retain the outer of the bearings 85 in position. A first bevel gear 87 attached to the extremity of the shaft 84 engages a second rotatable bevel gear 89 fixed to an output shaft 90 which is supported by a pair of bearings 91 pressed within a pair of cover plates 92 and 93, respectively, bolted to the housing 86. Thus, the gear box 79 transfers and redirects the rotational motion of the rearward directed splined shaft 55, via the gear box 61, the intermediate shaft 75, the universal joint 83 and the input shaft 84, to rotate the shaft 90; that shaft 90 being mounted for rotation upon the rotational axis of the aileron segment 16.

It is desirable to keep the sizes of the shafts 55 and 75, the transfer gear box 61, the direction-changing gear box 79, the shaft 90, etc., as small as possible so that these components can be of minimum weight and will best fit within the confines of the trailing edge of the wing. This feature is enhanced by connecting the shaft 90 to a torque multiplier 94 fixedly mounted to the flap segment upon the aileron segment hinge axis 81 for rotation thereabout. The components forward of the torque multiplier can be rotated at very high speeds and need only transmit a small amount of torque. The torque multiplier then increases that torque received while decreasing rotational velocity. The optimum torque multiplier 94 for this application is currently considered to be a planetary gear assembly such as shown generally in FIG. 2 and detailed in FIG. 8.

Figure 8:
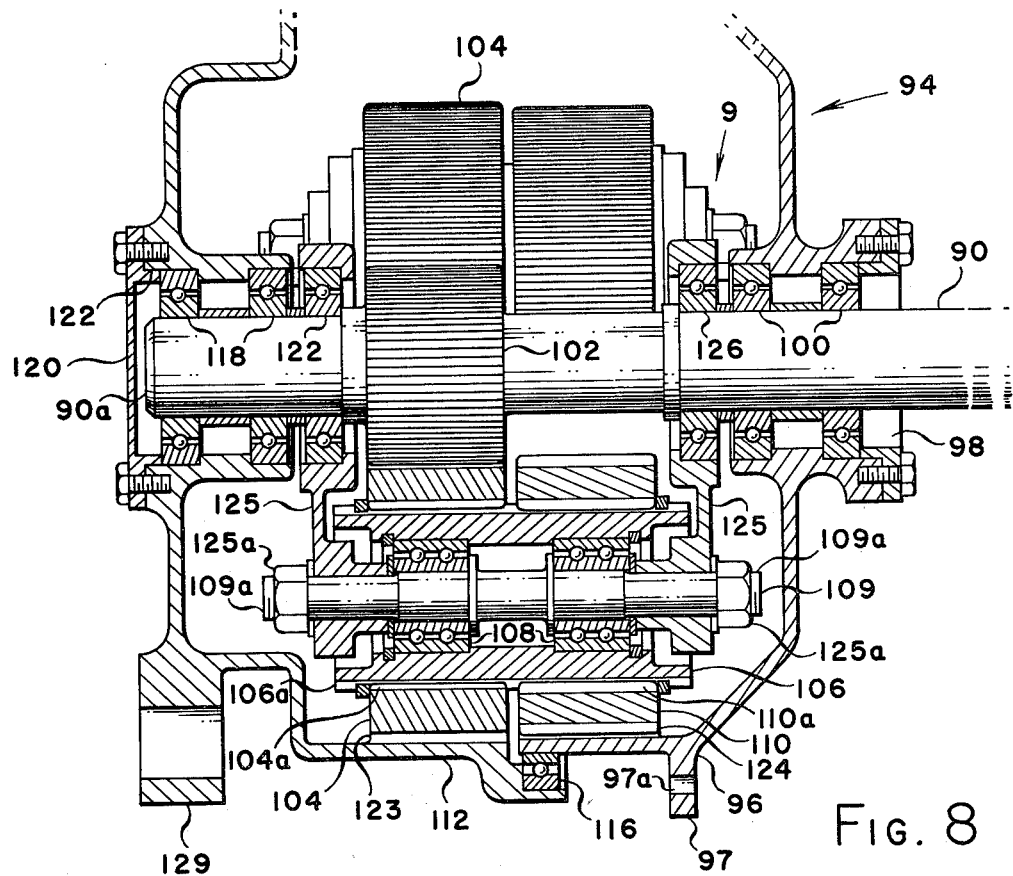
FIG. 8 is a fragmentary, cross-sectional view of the planetary gear assembly looking downward and illustrating the mechanism contained generally within the region encircled by the line 8 in FIG. 2.

The torque multiplier or gear assembly 94 consists of a generally bell-shaped housing 96 rigidly attached to the flap segment 14 by conventional means, such as the holes 97a in the representatively illustrated flange 97. The shaft 90 protrudes into the housing 96 via a passageway 98 and is rotatably supported by a pair of bearings 100 mounted in said housing. A sun gear 102 is affixed to or is integral with the shaft 90 intermediate of the shaft ends and within the gear assembly 94. This sun gear 102 engages a set, for example, of three planet gears 104 (only two of three gears equally spaced about the sun gear are shown in FIG. 8). The planet gears 104 are mounted on sleeves 106 by conventional means such as internal splines 104a on the planet gears, which mate with external splines 106a on the sleeve. The sleeves 106 are, in turn, each rotatably mounted by spaced bearings 108 on their respective shafts 109. A second group of three planet gears 110 (again only two of the three gears equally spaced around the sun gear 102 are shown) are also mounted by means of planet gear splines 110a engaging the splines 106a for retention upon the sleeves 106. The planet gears 104 are thereby required to rotate about the sun gear 102 and their own rotational axes in unison with the planet gears 110.

A second bell-shaped housing 112 has its open end bearing-mounted telescopically over the open end of the bell-housing 96. Bearings 116 positioned therebetween provide structural support and accommodate rotation of the housing 112 relative to the housing 96. The bell housing 112 is also mounted upon a pair of bearings 118 retained at an end 90a of the shaft 90. It includes a retainer cover 120 bolted over an opening 122 centrally of the housing. A ring gear 123 is integral with, welded to or otherwise appropriately affixed to the interior of the open end of the bell housing 112. Its teeth engage those of the planet gears 104.

The second set of planet gears 110 engage a ring gear 124 similarly mounted internally in housing 96.

A planetary gear support assembly 125 is rigidly attached to each threaded end 109a of each shaft 109 and secured thereto by nuts 125a to maintain equal angular spacing of the shafts 109 about the sun gear 102. These assemblies are rotatably supported by a pair of bearings 126 mounted on the shaft 90.

As shown in FIG. 3c, the bell housing 112 is connected to the aileron segment 16 for rotating the same about its axis through a link 128. That connection is accomplished through a perforated flange 129 on the bell housing 112 and a tab 130 extending from the aileron 16 excentric from its rotational axis. Alternatively, the link 128 may be connected to the output shaft 93 through the link 128a when the torque multiplier 94 is not used. The links 128 and 128a, in such event, are sometimes referred to as a linkage assembly.

Figure 9:
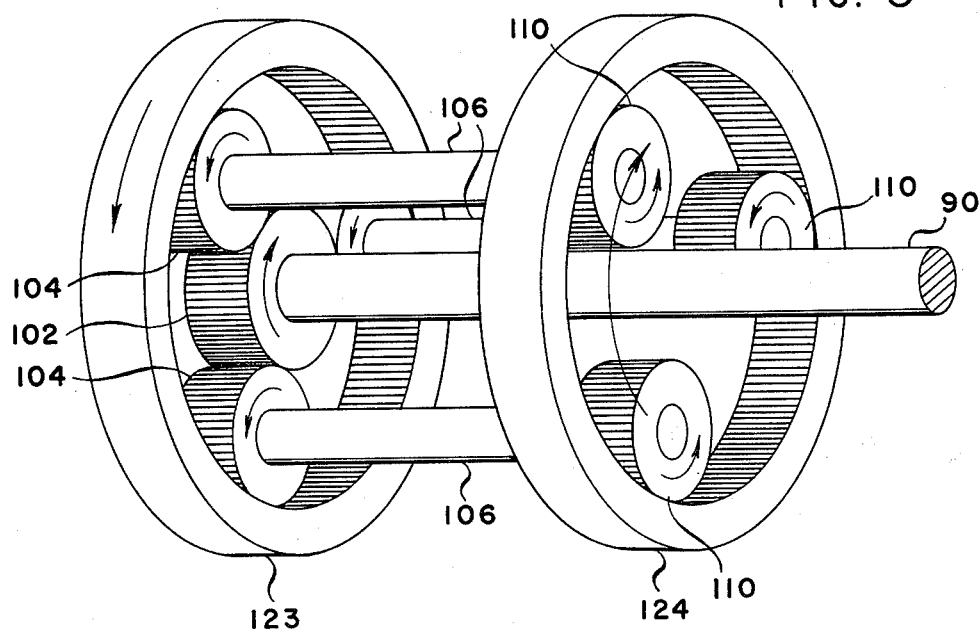
FIG. 9 is a semi-schematic view of the planetary gear box looking in the direction of arrow 9 in FIG. 8.

In FIG. 9 the planetary gear system of the torque multiplier 94 is shown in schematic form. If the sun gear 102 is caused to rotate clockwise, the individual planet gears 104, being bearing mounted upon their respective shafts 109, will rotate counter-clockwise around those shafts. This action causes the bearing-mounted planet gears 110 to also rotate counter-clockwise about the shafts 109 at the same rate as the planet gears 104. The shafts 109, being secured together by their support assemblies 125, and the planet gears 110 engaging the stationary ring gear 124 will rotate clockwise about the axis of the sun gear 102. The net effect is to cause ring gear 123 and the housing 112, to which the ring gear is attached, to rotate counter-clockwise. The aileron segment 16 being connected via link 128 to the housing 112, of course, also rotates counter-clockwise about its hinge axis 81.

With:
a sun gear 102 having 19 teeth,
a planet gear 104 having 20 teeth,
a ring gear 123 having 71 teeth,
a ring gear 124 having 70 teeth, and
a planet gear 110 having 25 teeth,
a torque multiplication of approximately 190 to 1 is obtained. Thus, on an aircraft such as Lockheed Aircraft Corporation's L-1011-500 aircraft, where a torque of 80,000 inch pounds is required for actuation of the aileron segment, the splined shaft 55 and other components need only be designed to take 410 inch pounds. Therefore, they can be made much smaller so as to easily fit within the confines of the trailing edge of the wing and lighter to reduce its total structural weight. It must be stressed at this point that the torque multiplier is not an absolute requirement and that the shaft 90 may be connected directly to the link 128. Such a direct hookup may be quite adequate on smaller aircraft.

A second power transfer means, or linkage assembly, can be said to comprise the direction changing gear box 79 and, when used, the torque multiplier 94a and interconnecting shaft 93, together with the link 128.

It should be noted that this flap actuation system and, in particular, the concept of supporting the flap at the forward end to a threaded shaft via a ball screw assembly is used on many aircraft. While the use of threaded shafts have been found to be one of the most practical means for extending and retracting the flaps and flaperon, it is not the only way. For example, a hydraulic cylinder mounted in the wing may be used with the piston rod connected directly to the lug 45 of the flaperon. The effect would be the same, in that the aileron segment actuation system would still be independent of the flap extension system. The gist of the invention, which is the compatible aileron segment control system, would remain intact.

Referring back to FIGS. 1 and 2, it can be seen that rotation of the threaded shafts 28 causes the ball screw assembly 35 to translate along that threaded shaft and the flaperon 12 to extend or retract. Since the transfer gear box 61 is connected via the intermediate shaft 75 and the universal joints 77 and 83 to the shaft 84 of the gear box 79, which is attached to the flap segment 14, as the flaperon translates the transfer gear box 61 is pulled or pushed (depending upon whether the flaperon is extending or retracting) and is caused to slide along the splined shaft 55. Any misalignment that occurs between the transfer gear box 61 and the bevel gear box 79, as the flaperon extends, is easily absorbed by the intermediate shaft 75 and universal joints 77 and 83. Further note that the aileron segment 16, connected to the flap segment 14 by conventional hinge assemblies 129 (one only shown in FIG. 2), does not change positions. Only when the motor 53 is actuated, causing the splined shaft 55 to rotate, is motion imparted to the aileron segment 16. This motion is completely independent of any motion imparted to or any position of the flaperon 12.

As shown in FIG. 10, when increased reliability is required, it may be achieved by the use of a redundancy, as defined by a dual aileron segment control system. This is easily accomplished by incorporating a dual output gear box 130 on the motor 53. This gear box is a conventional assembly having an output connected to the existing splined shaft 55. A second, angularly oriented output is connected to a shaft 132 positioned substantially parallel to the drive shaft 26e. The shaft 132 is connected at its opposite end to an angle gear box 134 mounted in the wing 4 at the outboard side of the flaperon. The output side of the gear box 134 is connected to a second splined shaft 55a mounted in beam 18c, similar to the mounting of the splined shaft 55 in beam 18b. Slidably mounted on the shaft 55a is a second transfer gear box 61a connected to a second direction-changing gear box 79a via intermediate second shaft 75a and universal joints 77a and 83a. The gear box 79a is then connected to a torque multiplier 94a via shaft 93a, and etc. Thus, a duplicate aileron segment control provides the required redundancy.

While the foregoing description has been directed toward an inboard flaperon, it is readily apparent that the outboard aileron 10 may also be made into a flaperon by simply applying the flap extension and retraction system across the outboard aileron.

Although the invention has been described in its preferred embodiments, it is recognized that modifications and variations may be made without departing from the spirit and scope of the invention.

I claim:

1. In an aircraft wing flaperon system comprising a flap, flap power means and means driven thereby to extend and retract the flap, flap guide means mounted in the wing to support and guide the flap, and an aileron segment contained within, defining a portion of and attached to the flap for rotation relative to the flap about an axis of rotation, an improved aileron segment control system comprising:

aileron segment rotation power means connected to receive pilot inputs;

a first power transfer means having an output shaft for controlling the aileron segment, said first power transfer means connected to and adapted to be supported and guided by the flap guide means in a generally translational mode along the wing, said transfer means attached to and caused to move with the flap by the means to extend and retract, and connected to both said aileron segment rotation power means and said output shaft such that said output shaft is driven responsive to pilot inputs;

a second power transfer means fixed to and movable with the flap and having an input shaft attached to receiver power from said first power transfer means and a power output means attached to the aileron segment for rotating the aileron segment about is axis of rotation; and flexible drive means connecting said output shaft of said first power transfer means to said input shaft of said second power transfer means for driving said power output means of said second transfer means in rotation.

2. The system of claim 1, further comprising:
a torque multiplier fixed to the flap, driven by said power output means and attached to the aileron segment for rotating that segment about its axis and relative to the flap with a higher torque than applied through said power output means.

3. The system of claim 1, wherein
said aileron segment rotation power means comprises:
   a motor connected to receive actuation signals from the aircraft pilot; and
   a drive shaft connected to said motor to be driven in rotation thereby and being mounted in the wing substantially parallel to the flaperon extension and retraction path.

4. The system of claim 3, wherein:
said drive shaft engages and drives said first power transfer means for causing said aileron segment to be rotated and to guide the direction of movement of said first power transfer means.

5. The system of claim 1, wherein said flexible drive means comprises:
first and second universal joints respectively fixed to said output shaft and to said input shaft and interconnected by an intermediate shaft.

6. The system of claim 1, wherein said second power transfer means comprises:
   a direction-changing gear box having an input shaft connected to and driven by said first power transfer means, said direction-changing gear box being attached to the aileron segment for rotating the same about its axis.

7. The system of claim 1, wherein said second power transfer means comprises:
   a direction-changing gear box fixed to said flap, and connected to and driven by said first power transfer means;
   a torque multiplier connected to said direction-changing gear box to receive power therefrom and substantially increase the torque output, and attached to said aileron segment to apply the amplified torque thereto for rotating the same about its axis.

8. The system of claim 1, wherein:
said aileron segment rotation power means comprises motor means for receiving pilot signals, translating them to and transmitting them as rotaty motion, and
shaft means connected to and driven in rotation by said motor means; and
said first power transfer means further comprises a transfer gear box enclosing a gear assembly, the gear assembly engaging and driven by the shaft means of said aileron segment rotation power means to provide a rotary output, said transfer gear box attached to and caused to translate by said means to extend and retract the flap to facilitate translation of the aileron segment with the flap without rotation of that segment relative to the flap; and said second power transfer means comprises,
   a direction-changing gear box fixed to the flap and connected to receive rotary power from said flexible drive means, and
   a torque multiplier fixed to the flap and operably connected to said direction-changing gear box and to the aileron segment for receiving rotary power from said gear box and applying it to the aileron segment for rotating the same about its axis of rotation.

9. The system of claim 1, wherein the gear assembly of said first power transfer means comprises:
   a first gear engaging said aileron segment rotation power means; and
   a second gear engaging said first gear and adopted to rotate the output shaft.

10. In an aircraft wing flaperon system comprising a flap segment, an aileron segment attached to the flap segment and having an axis of rotation, and means to extend and retract the flaperon, an improved aileron segment control system comprising:
   a first shaft rotatably mounted in the wing adjacent the flaperon and having its longitudinal axis oriented substantially parallel to the flaperon extension and retraction path;
   power means connected to and adapted to rotate said first shaft;
   an aileron segment rotation means mounted on the flap segment and operatively connected to the aileron segment for rotating that segment about its axis of rotation;
   a first shaft rotation transfer means mounted and translatable on said first shaft, having a second shaft offset from said first shaft, and a second shaft rotation means adapted to rotate said second shaft responsive to the rotation of said first shaft; and
   a connecting means operatively connected to the second shaft and said aileron segment rotation means and adapted to transmit rotation of said second shaft to said aileron segment rotation means;
   whereby, as the flaperon extends or retracts said first shaft rotation transfer means translates along said first shaft, and aileron segment rotation is accomplished by rotation of said first shaft.

11. The flaperon system of claim 10 wherein said first shaft rotation transfer means comprises:
   a housing having said second shaft rotatably mounted therein;
   first and second gears mounted for rotation in said housing, said first gear slidably engaging said first shaft; and
   said second gear engaging and driven by said first gear and fixed to said second shaft to cause its rotation responsive to rotation of said first shaft and first gear.

12. The flaperon system of claim 10 wherein said first shaft rotation transfer means further includes:
   a track mounted in the wing having an longitudinal axis substantially parallel to said first shaft; and
   a roller assembly attached to said housing and engaging said track, said roller assembly providing support for said first shaft rotation transfer means as it translates along said first shaft.

13. The flaperon system of claim 10 wherein said first shaft includes longitudinally extending splines.

14. The flaperon system of claim 10 wherein said connecting means comprises a third shaft operatively engaging said second shaft and said aileron segment rotation means and includes a plurality of universal joints.

15. The flaperon system of claim 10 wherein said aileron segment rotation means comprises:
a direction-changing gear box fixedly mounted to the flap segment with its rotational axis on the rotational axis of the aileron segment, having an input member operatively engaged and driven by said connecting means, and an output member substantially parallel to the axis of rotation of the aileron segment; and
a linkage assembly fixed to the flap segment for rotating the aileron segment about its axis of rotation,
having an input member operatively engaging the output member of said direction changing gear box, and
an output member operatively connected to the aileron segment.

16. The flaperon system of claim 15 wherein said linkage assembly comprises:
a torque multiplier fixedly mounted to the flap segment and having
an input member operatively connected to the output member of said direction changing gear box, and
an output member,
said torque multiplier multiplying the torque applied by said output member of said direction changing gear box; and
a link pivotly connected at one of its ends to said output member of said torque multiplier and its opposite end to the aileron segment.

17. The flaperon system of claim 16 wherein said torque multiplier is a planetary gear assembly.

18. In an aircraft wing flaperon system comprising a flap segment, an aileron segment attached to the flap segment and having an axis of rotation, and means to extend and retract the flaperon, an improved aileron segment control system comprising:
first and second shafts rotatably mounted in the wing, said first shaft mounted on the inboard side of the flaperon, and said second shaft mounted on the outboard side of the flaperon, both of said shafts having their longitudinal axes substantially parallel to the flaperon extension and retraction path;
a power means operatively connected to said first and second shafts and adopted to rotate said first and second shafts in unison;
first and second aileron segment rotation means fixed to opposite sides of the flap segment, to rotate the aileron segment about its axis of rotation;
first and second shaft rotation transfer means respectively mounted and translatable on said first and second shafts, each such transfer means having an output shaft offset from its respective said first or second shaft, each adapted for transferring rotation of said first and second shafts respectively to said first and second outputs shafts; and
first and second connecting means, connected to said first output shaft and said first aileron segment rotation means and said second connecting means connected to said second output shaft and said second aileron segment rotation means for causing their rotation;
whereby, as the flaperon extends or retracts said first and second shaft rotation means respectively translate along said first and second shafts and aileron segment rotation is accomplished by rotation of said first and second shafts.

19. In an aircraft wing flaperon system comprising a flap, flap power means and means driven thereby to extend and retract the flap, and an aileron segment contained within, defining a portion of and attached to the flap for rotation relative to the flap about an axis of rotation, an improved aileron segment control system comprising:
aileron segment rotation power means connected to receive pilot means comprising:
a motor connected to receive actuation signals from the aircraft pilot, and
a drive shaft connected to said motor to be driven in rotation thereby, said drive shaft being mounted in the wing substantially parallel to the flaperon extension and retraction path;
a first power transfer means including:
a hollow gear slidably engaging and rotatable by said drive shaft,
a second gear engaging and driven in rotation by said hollow gear, and
an output shaft engaging and driven in rotation by said second gear;
said first power transfer means attached to and caused to move with the flap by the means to extend and retract and connected to both said aileron segment rotation power means and said output shaft such that said output shaft is driven responsive to pilot inputs;
a second power means fixed to and movable with the flap and having:
an input shaft attached to receive power from said first power transfer means, and
a power output means attached to the aileron segment for rotating the aileron segment about its axis of rotation; and
flexible drive means connecting said output shaft of said first power transfer means to said input shaft of said second power transfer means for driving said power output means of said second transfer means in rotation.

20. The system of claim 19, wherein said drive shaft is externally splined, and said hollow gear is internally splined.

* * * * *